US009252846B2

(12) United States Patent
Lee et al.

(10) Patent No.: US 9,252,846 B2
(45) Date of Patent: Feb. 2, 2016

(54) SYSTEMS AND METHODS FOR DETECTING AND IDENTIFYING A WIRELESS POWER DEVICE

(75) Inventors: Kevin Douglas Lee, San Diego, CA (US); Zhen Ning Low, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 803 days.

(21) Appl. No.: 13/464,834

(22) Filed: May 4, 2012

(65) Prior Publication Data

US 2013/0062959 A1    Mar. 14, 2013

Related U.S. Application Data

(60) Provisional application No. 61/532,818, filed on Sep. 9, 2011.

(51) Int. Cl.
*H04B 5/00* (2006.01)
*H02J 5/00* (2006.01)
*H04B 5/02* (2006.01)

(52) U.S. Cl.
CPC ............ *H04B 5/0056* (2013.01); *H02J 5/005* (2013.01); *H04B 5/0031* (2013.01); *H04B 5/0037* (2013.01); *H04B 5/0043* (2013.01); *H04B 5/0075* (2013.01); *H04B 5/02* (2013.01)

(58) Field of Classification Search
CPC ............... H02J 7/00; H04B 1/18; H04B 1/40; H04B 5/00
USPC ........................................................ 307/104
See application file for complete search history.

(56) References Cited

U.S. PATENT DOCUMENTS

| 3,656,132 | A | 4/1972 | Brumbelow |
| 2006/0022815 | A1 | 2/2006 | Fischer et al. |
| 2007/0216392 | A1 | 9/2007 | Stevens et al. |
| 2008/0094027 | A1* | 4/2008 | Cho .............................. 320/108 |

(Continued)

FOREIGN PATENT DOCUMENTS

| CN | 1954472 A | 4/2007 |
| CN | 101821919 A | 9/2010 |

(Continued)

OTHER PUBLICATIONS

International Search Report and Written Opinion—PCT/US2012/053798—ISA/EPO—Nov. 27, 2012.

(Continued)

*Primary Examiner* — Thienvu Tran
*Assistant Examiner* — David M Stables
(74) *Attorney, Agent, or Firm* — Knobbe Martens Olson & Bear LLP

(57) ABSTRACT

Embodiments are directed to detecting and identifying a type of a wireless power device in a wireless power transfer field. According to one aspect, systems and methods are disclosed which describe limiting power transfer to non-compliant devices and detection of undesired power absorbers, such as metal objects, in a wireless power system. A method may include detecting one or more non-compliant devices and/or undesired wireless power absorbers positioned within a charging region of a wireless power transmitter. The method may further include limiting an amount of power transmitted by a transmitter in response to the detection, or reducing the amount of power received by the non-compliant device.

24 Claims, 13 Drawing Sheets

(56) References Cited

U.S. PATENT DOCUMENTS

| | | | |
|---|---|---|---|
| 2008/0227478 A1* | 9/2008 | Greene et al. | 455/522 |
| 2009/0021219 A1* | 1/2009 | Yoda et al. | 320/137 |
| 2009/0127936 A1 | 5/2009 | Kamijo et al. | |
| 2009/0302800 A1 | 12/2009 | Shiozaki et al. | |
| 2010/0013322 A1 | 1/2010 | Sogabe et al. | |
| 2010/0052431 A1* | 3/2010 | Mita | 307/104 |
| 2010/0084918 A1* | 4/2010 | Fells et al. | 307/32 |
| 2010/0176659 A1* | 7/2010 | Aoyama et al. | 307/104 |
| 2010/0181961 A1* | 7/2010 | Novak | H02J 7/025 320/108 |
| 2010/0207575 A1 | 8/2010 | Pijnenburg et al. | |
| 2010/0222010 A1* | 9/2010 | Ozaki | H02J 5/005 455/77 |
| 2010/0264746 A1 | 10/2010 | Kazama et al. | |
| 2011/0128015 A1* | 6/2011 | Dorairaj et al. | 324/629 |
| 2011/0175705 A1 | 7/2011 | Bellows | |
| 2011/0221388 A1 | 9/2011 | Low et al. | |

FOREIGN PATENT DOCUMENTS

| | | |
|---|---|---|
| EP | 0558316 A1 | 9/1993 |
| JP | 2007537688 A | 12/2007 |
| JP | 2009148493 A | 7/2009 |
| WO | WO-2005081115 A1 | 9/2005 |
| WO | WO-2005109597 A1 | 11/2005 |
| WO | WO2005109598 A1 | 11/2005 |
| WO | WO2009081115 A1 | 7/2009 |
| WO | 2010040015 A2 | 4/2010 |
| WO | WO-2010085701 A2 | 7/2010 |
| WO | WO-2010093965 A2 | 8/2010 |
| WO | WO-2013088238 A2 | 6/2013 |

OTHER PUBLICATIONS

Kuyvenhoven, N., et al., "Development of a Foreign Object Detection and Analysis Method for Wireless Power Systems," 2011 IEEE Symposium on Product Compliance Engineering (PSES), pp. 1-6.

* cited by examiner

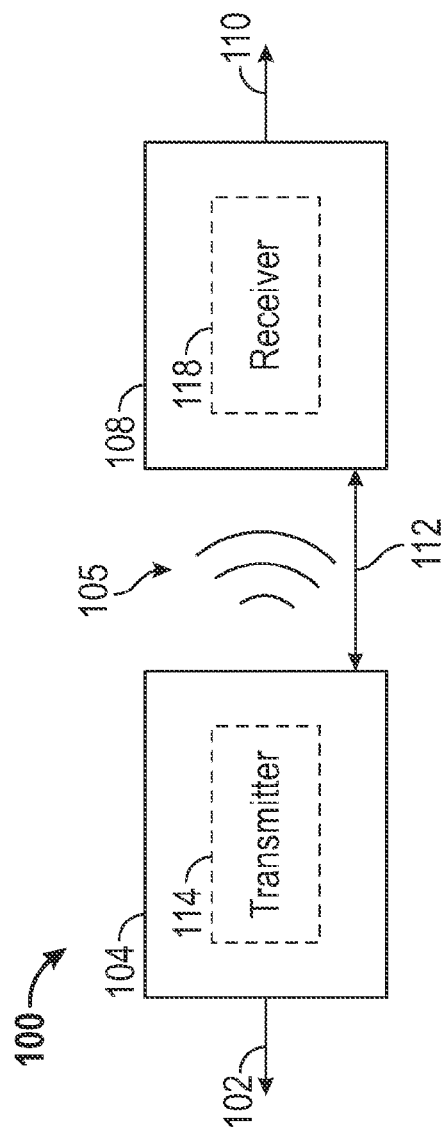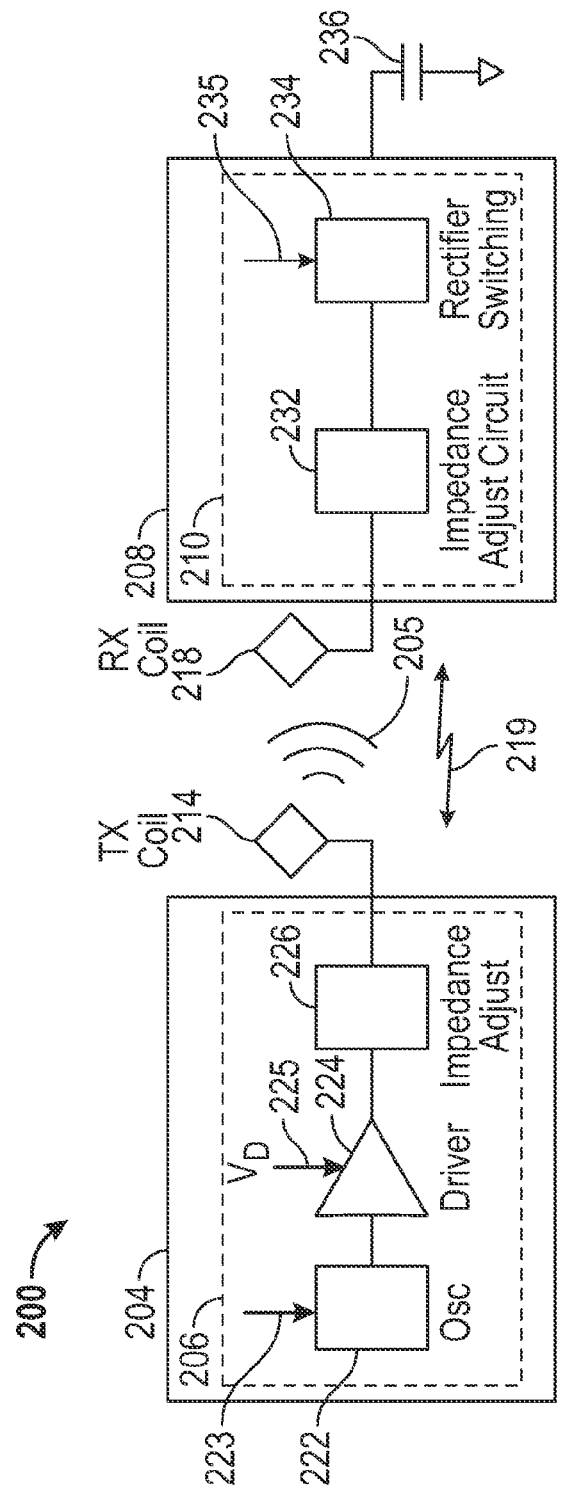

SYSTEMS AND METHODS FOR DETECTING AND IDENTIFYING A WIRELESS POWER DEVICE

CROSS REFERENCE TO RELATED APPLICATIONS

This application claims priority benefit under 35 U.S.C. §119(e) to U.S. Provisional Patent Application No. 61/532,818 entitled "SYSTEMS AND METHODS FOR DETECTING A WIRELESS POWER ABSORBER" filed on Sep. 9, 2011, the disclosure of which is hereby incorporated by reference in its entirety.

FIELD

The present invention relates generally to wireless power. More specifically, the disclosure is directed to systems, device, and methods for detecting an unauthorized and/or unintended device, a near-field communication device, or a combination thereof, within a charging region of a wireless power transmitter. Furthermore, some embodiments of the present invention relate to systems, devices, and methods for adjusting wireless power transfer and/or limiting wireless power delivery based on detection of an unauthorized devices and/or unintended devices, a near-field communication devices, or a combination thereof, positioned with a charging region of a wireless power transmitter.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

According to one aspect, an apparatus for detecting an object within a power delivery region of a wireless power transmitter configured to transfer power to a device having a wireless power receiver is disclosed. The apparatus includes a driver configured to generate a driving signal to drive a circuit to output a wireless power field, a sensor configured to sense an amount of power drawn by the driver to generate a sensing signal, a communication unit configured to receive, from the wireless power receiver, a signal indicative of a change in power received by the wireless power receiver, and a controller configured to monitor a change in a power drawn by the driver based on the sensing signal and identify the type of object based on at least one of the monitored change in the power drawn and the received signal.

According to another aspect a method of identifying a type of an object within a power transfer region of a wireless power transmitter configured to transfer power to a device including a wireless power receiver is disclosed. The method includes monitoring a change in a power drawn by the wireless power transmitter, receiving, from the wireless power receiver, a signal indicative of a change in power received by the wireless power receiver, and identifying the type of the object based on the monitored change in the power drawn and the received signal.

According to another aspect an apparatus for identifying a type of an object within a power transfer region of a wireless power transmitter configured to transfer power to a device including a wireless power receiver is disclosed. The apparatus includes means for monitoring a change in a power drawn by the wireless power transmitter, means for receiving, from the wireless power receiver, a signal indicative of a change in power received by the wireless power receiver, and means for identifying the type of the object based on the monitored change in the power drawn and the received signal.

BRIEF DESCRIPTION OF THE DRAWINGS

FIG. 1 is a functional block diagram of a wireless power transfer system according to some embodiments.

FIG. 2 is a functional block diagram of components that may be used in the wireless power transfer system of FIG. 1 according to some embodiments.

Figure 3:
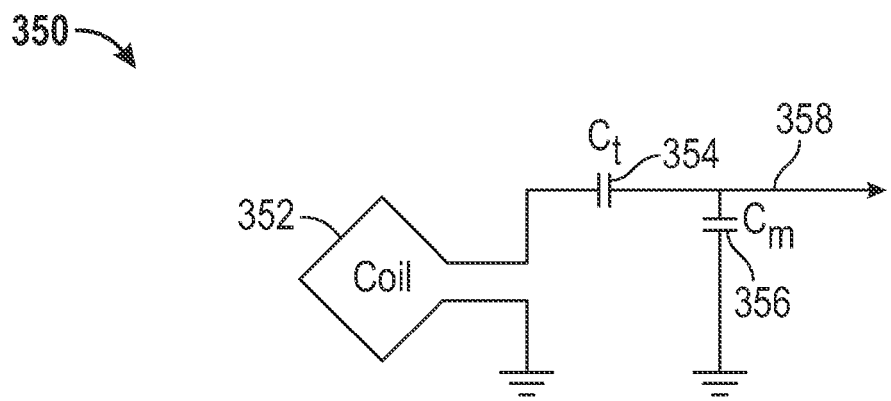
FIG. 3 is a schematic diagram of a portion of transmit circuitry or receive circuitry of FIG. 2 including a transmit or receive coil according to some embodiments.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, well-known structures and devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some embodiments, the field 105 may correspond to the "near-field" of the transmitter 104 as will be further described below. The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some embodiments the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 105 of the transmit coil 114 to a receive coil 118 rather than propagating most of the energy in an electromagnetic wave to the far field. When positioned within the field 105, a "coupling mode" may be developed between the transmit coil 114 and the receive coil 118. The area around the transmit and receive coils 114 and 118 where this coupling may occur is referred to herein as a coupling-mode region.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz that may be adjusted in response to a frequency control signal 223. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit coil 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have an associated load capable of being selectively disabled (e.g., battery 236), may be configured to determine whether an amount of power transmitted by transmitter 204 and receiver by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

FIG. 3 is a schematic diagram of a portion of transmit circuitry 206 or receive circuitry 210 of FIG. 2 including a transmit or receive coil 352, in accordance with exemplary embodiments of the invention. As illustrated in FIG. 3, transmit or receive circuitry 350 used in exemplary embodiments may include a coil 352. The coil may also be referred to or be configured as a "loop" antenna 352. The coil 352 may also be referred to herein or be configured as a "magnetic" antenna or an induction coil. The term "coil" is intended to refer to a component that may wirelessly output or receive energy for coupling to another "coil." The coil may also be referred to as an "antenna" of a type that is configured to wirelessly output or receive power. The coil 352 may be configured to include an air core or a physical core such as a ferrite core (not shown). Air core loop coils may be more tolerable to extraneous physical devices placed in the vicinity of the core. Furthermore, an air core loop coil 352 allows the placement of other components within the core area. In addition, an air core loop may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another non-limiting example, a capacitor may be placed in parallel between the two terminals of the coil 350. For transmit coils, a signal 358 with a frequency that substantially corresponds to the resonant frequency of the coil 352 may be an input to the coil 352.

In one embodiment, the transmitter 104 may be configured to output a time varying magnetic field with a frequency corresponding to the resonant frequency of the transmit coil 114. When the receiver is within the field 105, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

Figure 4:
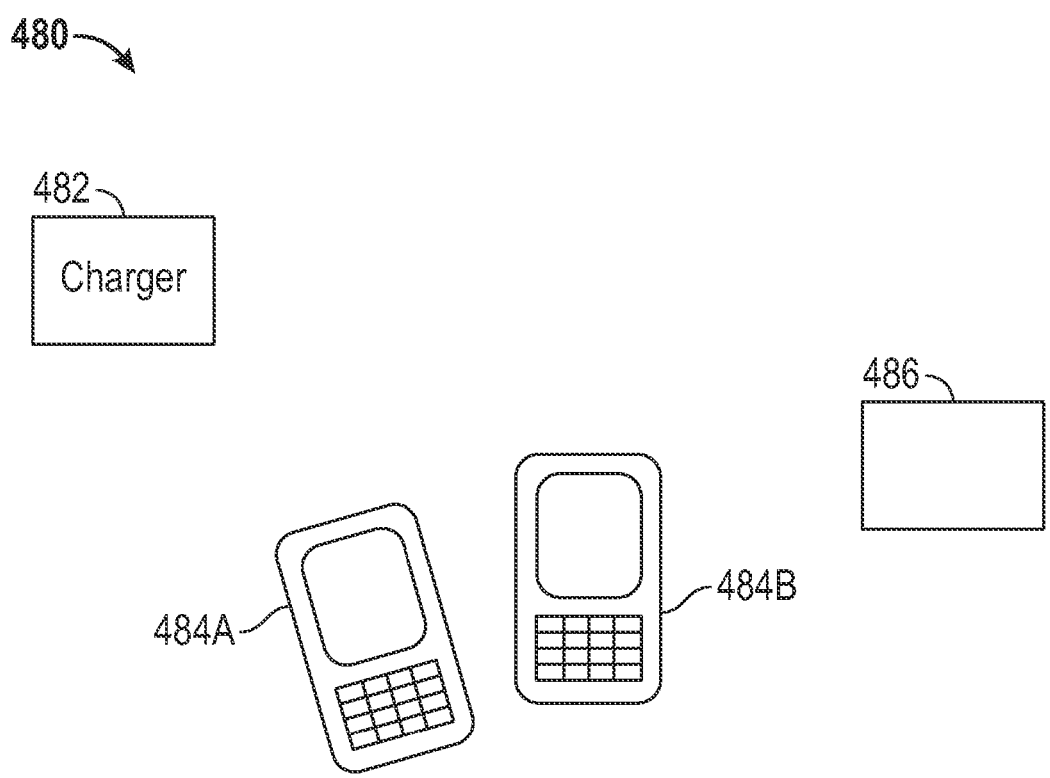
FIG. 4 illustrates another wireless power transfer system including wireless power receivers and an absorber, component, or device according to some embodiments.

FIG. 4 illustrates a wireless power transfer system including an absorber, component, or device, according to some embodiments. As illustrated in FIG. 4, the wireless power system 480 includes a wireless charger 482 and one or more wireless power chargeable devices 484A and 484B.

Wireless power system 480 further includes a component, absorber, or device 486 (herein absorber 486), which may comprise a non-compliant device, such as a near-field communication (NFC) device or an RFID card. A NFC device may use induction between an antenna of the NFC device and an antenna of a device in communication with the NFC device. For example, absorber 486 may be a NFC device configured to communicate with a device including the wireless charger 482. Absorber 486 may also be an unintentional wireless power absorber component, such as a metal object. A metal object may interfere with the operation of the wireless charger 482 and the power received by a chargeable device 484A or 484B by affecting the wireless power field. Device 486 and each wirelessly chargeable device 484A and 484B may be positioned within a charging region of wireless charger 482. The orientation of the devices is not restricted to the orientation of the devices as illustrated in FIG. 4.

As discussed above, in a wireless power charging system, unauthorized devices or other components may interfere with the operation of a charging device in transmitting power to a device to be charged. For example, when an unintentional power absorber or a significantly large piece of metal is added to a wireless charging system, shutting down or lowering the power transmitted may be performed to protect the system and the unintentional power absorbers. NFC devices can absorb significant amounts of power and can significantly heat up since they are not designed to handle high power levels. For example, a NFC device, which is operating at the same frequency or capable of picking up power from a wireless power transmitter, may receive excessive power from the wireless power transmitter. Receiving excessive power may result in undesirable heating of the NFC device. Further, an unintentional absorber, such as a metal object, may interfere with operation of the wireless power system. For example, large amounts of metal can have an adverse effect on the system by detuning the system to such an extent such that the transmitter operates outside of its normal operating parameters. In addition, a rouge receiver may attempt to pick up power from a wireless power transmitter, which may affect power delivery to a valid receiver and, further, may affect efficiency of a wireless power system. In any of the above examples, it is desirable to detect the addition of such elements and adjust the parameters of the wireless power transfer system (e.g., by lowering the transmitted power) to protect the devices in the system and transfer power more efficiently.

In order to determine how to adjust the parameters of the wireless power system, identification of the types of devices that are present in the wireless power transfer field is performed according to some embodiments. For example, a system may distinguish between the addition of intended charging devices and other elements. With reference to FIG. 4, wireless charger 482 may be configured to identify the object type of the absorber 486. Moreover, wireless charger 482 may be configured to adjust a wireless power field and/or protect an absorber 486, such as a NFC device, upon identification thereof. According to some embodiments described herein, with minimal hardware requirements, a system may be capable of allowing protection of NFC devices from being destroyed and protection of the wireless power transmitter from operating in an inefficient state that could cause damage to devices in the wireless power system.

Furthermore, wireless charger 482 may be configured to, according to one or more methods, protect (e.g., reduce or possibly eliminate power transfer) one or more non-compliant devices (e.g., absorber 486), which are detected within an associate charging region. According to some embodiments, wireless charger 482 may be configured to transfer power within an area, which is within a region of an associated transmit antenna or coil, that a device should not be positioned. As a more specific example, wireless charger 482 may be configured in a manner to prevent a device, such as a NFC device, from being positioned immediately adjacent a transmit antenna 514. Therefore, the device (e.g., a NFC device) may not be positioned within a zone with the strongest field. According to another embodiment, wireless charger 482 may be configured to reduce, or eliminate, (e.g., turn off) the power transferred therefrom upon detection of a NFC or RFID device. According to yet another embodiment, a load impedance of each compliant device (e.g., wirelessly chargeable device 484A or 484B) may be reduced, thus, reducing an amount of power delivered to a non-compliant device which is positioned within an associated charging region.

Figure 5:
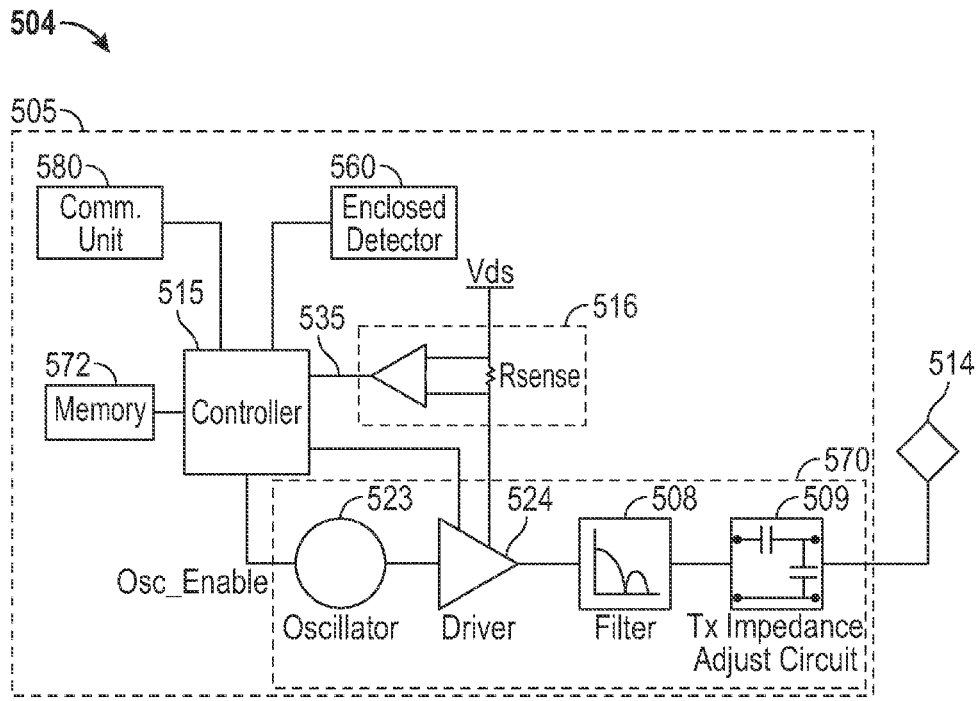
FIG. 5 is a block diagram of a wireless power transmitter that may be used in the wireless power transfer system of FIG. 1 and FIG. 4 according to some embodiments.

FIG. 5 is a block diagram of a wireless power transmitter that may be used in the wireless power transfer system of FIG. 1 and FIG. 4 according to some embodiments. The transmitter 504 may be included in a charger, such as a charger 482 as described with reference to FIG. 4 above. The transmitter 504 may include transmit circuitry 505 and a transmit coil 514. The transmit coil 514 may be the coil 352 as shown in FIG. 3. Transmit circuitry 505 may provide RF power to the transmit coil 514 by providing an oscillating signal resulting in generation of energy (e.g., magnetic flux) about the transmit coil 514. Transmitter 504 may operate at any suitable frequency. By way of example, transmitter 504 may operate at the 13.56 MHz ISM band.

Transmit circuitry 505 may include a TX impedance adjustment circuit 509 configured to adjust the impedance of the transmit circuitry 505 based on the impedance of the transmit coil 514 to increase efficiency. The transmit circuitry 505 may also include a low pass filter (LPF) 508 configured to reduce harmonic emissions to levels to prevent self-jamming of devices coupled to receivers 108 (FIG. 1). Other embodiments may include different filter topologies, including but not limited to, notch filters that attenuate specific frequencies while passing others and may include an adaptive impedance match, that may be varied based on measurable transmit metrics, such as output power to the transmit coil 514 or DC current drawn by the driver 524. Transmit circuitry 505 further includes a driver 524 configured to drive an RF signal as determined by an oscillator 523. The oscillator 523, driver 524, low pass filter 508 and impedance adjustment circuit 509 may be commonly referred to as transmitter driving circuit 570. The transmit circuitry 505 may be comprised of discrete devices or circuits, or alternately, may be comprised of an integrated assembly. One example of power output from transmit coil 514 may be on the order of 2.5 Watts.

Transmit circuitry 505 may further include a controller 515 for selectively enabling the oscillator 523 during transmit phases (or duty cycles) for specific receivers, for adjusting the frequency or phase of the oscillator 523, and for adjusting the output power level for implementing a communication protocol for interacting with neighboring devices through their attached receivers. The controller 515 may also be referred to herein as processor 515. Adjustment of oscillator phase and related circuitry in the transmission path may allow for reduction of out of band emissions, especially when transitioning from one frequency to another.

The transmit circuitry 505 may further include a load sensing circuit 516 configured to detect the presence or absence of active receivers in the vicinity of the near-field generated by transmit coil 514. By way of example, a load sensing circuit 516 monitors the current flowing to the driver 524, that may be affected by the presence or absence of active receivers in the vicinity of the field generated by transmit coil 514 as will be further described below. Detection of changes to the loading on the driver 524 is monitored by controller 515 for use in determining whether to enable the oscillator 523 for transmitting energy and to communicate with an active receiver. As described in greater detail below with reference to FIGS. 8, 13, and 14, a current measured at the driver 524 may be used to determine whether an invalid device is positioned within a wireless power transfer region of the transmitter 504.

The transmit coil 514 may be implemented with a Litz wire or as an antenna strip with the thickness, width and metal type selected to keep resistive losses low. In one implementation, the transmit coil 514 may generally be configured for association with a larger structure such as a table, mat, lamp or other less portable configuration. Accordingly, the transmit coil 514 generally may not need "turns" in order to be of a practical dimension. An example implementation of a transmit coil 514 may be "electrically small" (e.g., having a size equal to a fraction of the wavelength) and tuned to resonate at lower usable frequencies by using capacitors to define the resonant frequency.

The transmitter 504 may gather and track information about the whereabouts and status of receiver devices that may be associated with the transmitter 504. Thus, the transmit circuitry 505 may include a memory 572, a detector and/or communication unit 580, an enclosed detector 560, or a combination thereof, connected to the controller 515 (also referred to as a processor herein). The controller 515 may adjust an amount of power delivered by the driver 524 in response to presence signals from the detection and/or communication unit 580 and the enclosed detector 560. For example, the detection and/or communication unit 580 may be configured to receive a communication signal from one or more wireless power receivers that are in the vicinity of the transmitter 504, or may detect the presence of a device or object within a vicinity of the transmitter 504. Information regarding various operational parameters of wireless power receivers may be stored in memory 572 for use by the transmitter 504. The controller 515 may be configured to control an output of the transmitter 504 based on the information received from the detection and/or communication unit 580.

As a non-limiting example, the detection and/or communication unit 580 may include a motion detector utilized to sense the initial presence of a device to be charged that is inserted into the coverage area of the transmitter 504. After detection, the transmitter 504 may be turned on and the RF power received by the device may be used to toggle a switch on the RX device in a pre-determined manner, which in turn results in changes to the driving point impedance of the transmitter 504.

As another non-limiting example, the detection and/or communication unit 580 may include a detector capable of detecting a human, for example, by infrared detection, motion detection, or other suitable means. In some embodiments, there may be regulations limiting the amount of power that a transmit coil 514 may transmit at a specific frequency. In some embodiments, these regulations are meant to protect humans from electromagnetic radiation. However, there may be environments where a transmit coil 514 is placed in areas not occupied by humans, or occupied infrequently by humans, such as, for example, garages, factory floors, shops, and the like. If these environments are free from humans, it may be permissible to increase the power output of the transmit coil 514 above the normal power restrictions regulations. In other words, the controller 515 may adjust the power output of the transmit coil 514 to a regulatory level or lower in response to human presence and adjust the power output of the transmit coil 514 to a level above the regulatory level when a human is outside a regulatory distance from the electromagnetic field of the transmit coil 514.

As a non-limiting example, the enclosed detector 560 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

The transmitter 504 may receive power through a number of power sources, such as, for example, an AC-DC converter (not shown) to convert conventional AC power present in a building, a DC-DC converter (not shown) to convert a conventional DC power source to a voltage suitable for the transmitter 504, or directly from a conventional DC power source (not shown).

In some embodiments, a method by which the transmitter 504 does not remain on indefinitely may be used. In this case, the transmitter 504 may be programmed to shut off after a user-determined amount of time. This feature may prevent the transmitter 504, notably the driver 524, from running long after the wireless devices in its perimeter are fully charged. This event may be due to the failure of a circuit (e.g., the detection and/or communication unit 580) configured to detect a signal sent from either the repeater or the receive coil that a device is fully charged. To prevent the transmitter 504 from automatically shutting down if another device is placed in its perimeter, the transmitter 504 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 6:
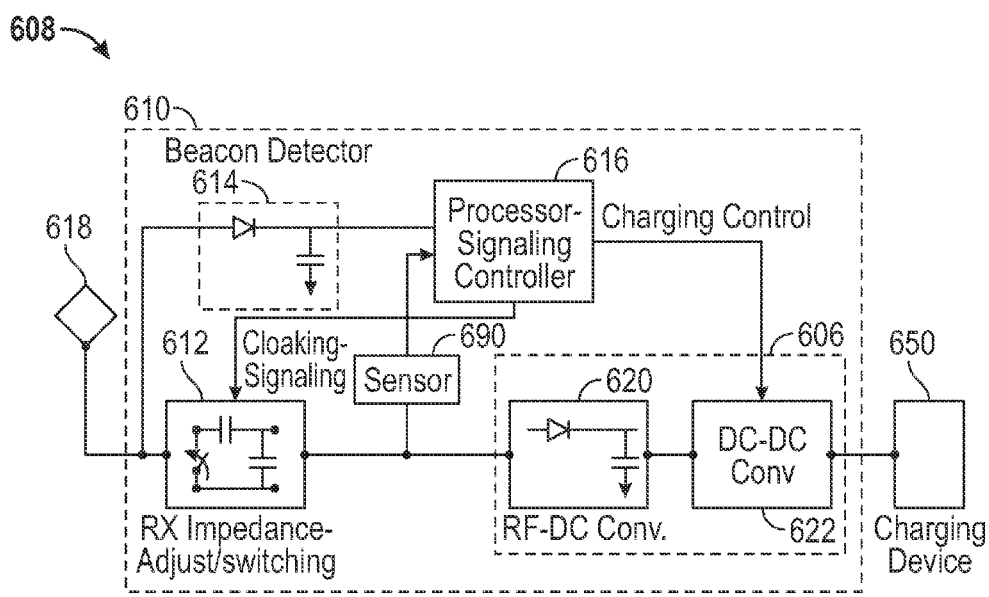
FIG. 6 is a block diagram of a receiver 608 that may be used in the wireless power transfer system of FIG. 1 and FIG. 4 according to some embodiments.

FIG. 6 is a block diagram of a receiver 608 that may be used in the wireless power transfer system of FIG. 1 and FIG. 4 according to some embodiments. For example, receiver 608 may be included in one of chargeable devices 484A or 484B as described with reference to FIG. 4 above, and may be configured to receive power from a charger, such as a charger 482 including a transmitter (e.g. transmitter 504) as described above. The receiver 608 includes receive circuitry 610 that may include a receive coil 618. Receiver 608 is also connected to or electrically coupled with a charging device 650 for providing received power thereto. It should be noted that receiver 608 is illustrated as being external to charging device 650 but may be integrated into charging device 650. Energy may be propagated wirelessly to receive coil 618 and then coupled through the receive circuitry 610 to charging device 650. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive coil 618 may be tuned to resonate at the same frequency, or within a specified range of frequencies, as transmit coil 514 (as shown in FIG. 5). Receive coil 618 may be similarly dimensioned with transmit coil 514 or may be differently sized based upon the dimensions of the associated charging device 650. By way of example, charging device 650 may be a portable electronic device having diametric or length dimension smaller that the diameter of length of transmit coil 514. In such an example, receive coil 618 may be implemented as a multi-turn coil in order to reduce the capacitance value of a tuning capacitor (not shown) and increase the receive coil's impedance. By way of example, receive coil 618 may be placed around the substantial circumference of charging device 650 in order to maximize the coil diameter and reduce the number of loop turns (e.g., windings) of the receive coil 618 and the inter-winding capacitance.

Receive circuitry 610 may provide an impedance adjustment of the effective impedance of receiver based on an impedance of the receive coil 618. Receive circuitry 610 includes power conversion circuitry 606 for converting a received RF energy source into charging power for use by the charging device 650. Power conversion circuitry 606 may be generally referred to as a voltage regulator for converting the received power from the wireless filed to power for charging the load. In some embodiments, power conversion circuitry 606 includes an RF-to-DC converter 620 and may also in include a DC-to-DC converter 622. RF-to-DC converter 620 is configured to rectify the RF energy signal received at receive coil 618 into a non-alternating power with an output voltage $V_{rect}$. The DC-to-DC converter 622 (or other power regulator) converts the rectified RF energy signal into an energy potential (e.g., voltage) that is compatible with charging device 650 with an output voltage and output current $V_{out}$ and $I_{out}$. Various RF-to-DC converters may be used, including partial and full rectifiers, regulators, bridges, doublers, as well as linear and switching converters.

Receive circuitry 610 also includes a sensor 690 connected to an output of the Rx match-switch 612 and an input of the power conversion circuitry 606. The sensor 690 may be coupled to, or be in communication with, processor 616 as illustrated in FIG. 6. The sensor 690 is configured to sense a voltage level (e.g. $V_{Reg}$) at an input of the power conversion circuitry 606. In some implementations, the sensor 690 is configured to measure a voltage level at an input of a regulator configured to convert received power to power for charging the charging device 650. The measured voltage level may be communicated to or detected by the processor 616 for controlling operation of the receiver. In some embodiments, the measured voltage level $V_{Reg}$ may be communicated back to the transmitter (e.g., transmitter 504) for controlling operation of the transmitter. The method of controlling the charging system based on the measured voltage level $V_{Reg}$ will be described in more detail with reference to FIGS. 8, 13, and 14 below.

Receive circuitry 610 may further include RX impedance adjustment and switching circuitry 612. The RX impedance adjustment and switching circuit may be configured to adjust an impedance of the receive circuitry 610 based on an impedance of the receive coil 618 to improve efficiency during power transfer. Further, the RX impedance adjustment and switching circuitry 612 may be configured to connect receive coil 618 to the power conversion circuitry 606 or alternatively disconnect the power conversion circuitry 606. Disconnecting receive coil 618 from power conversion circuitry 606 not only suspends charging of charging device 650, but also changes the "load" as "seen" by the transmitter 404 (FIG. 2).

In some embodiments, transmitter 504 includes load sensing circuit 516 that may detect fluctuations in the bias current provided to transmitter driver circuit 524. Accordingly, transmitter 504 has a mechanism for determining when receivers are present in the transmitter's near-field.

When multiple receivers 608 are present in a transmitter's near-field, it may be desirable to time-multiplex the loading and unloading of one or more receivers to enable other receivers to more efficiently couple to the transmitter 504. A receiver 608 may also be cloaked in order to eliminate coupling to other nearby receivers or to reduce loading on nearby transmitters. This "unloading" of a receiver is also known herein as a "cloaking."

With returned reference to FIG. 4, and as discussed above, wireless charger 482 may be configured to detect and identify, according to one or more methods, one or more non-compliant devices (e.g., absorber 486) positioned within an associated charging region. According to some embodiments, wireless charger 482 may be configured to determine whether or not power, which is being transmitted by a wireless power transmitter (e.g., transmitter 504 of FIG. 5) of wireless charger 482 within an associated charging region, is unaccounted for. According to another embodiment, after each wirelessly chargeable device 484A or 484B is cloaked, wireless charger 482 may be configured to measure one or more properties at a transmitter to determine whether a non-compliant device is drawing power. According to yet another embodiment, after each chargeable device 484A or 484B is cloaked, wireless charger 482 may be configured to determine, via one or more measured properties associated with the transmitter and one or more measured properties associated with one or more wirelessly chargeable devices 484A and 484B, whether a non-compliant device is drawing power.

Furthermore, switching between unloading and loading controlled by receiver 608 and detected by transmitter 504 may provide a communication mechanism from receiver 608 to transmitter 504. Additionally, a protocol may be associated with the switching that enables the sending of a message from receiver 608 to transmitter 504. By way of example, a switching speed may be on the order of about 100 μsec.

Additionally, or alternatively, according to some embodiments, each of the chargeable devices 484A and 484B may be configured to continue to receive power while communicating information to the a charger 482. Further, in some embodiments, communication between the transmitter 504 and the receiver 608 refers to a device sensing and charging control mechanism (e.g., in-band signaling using the coupling field), rather than conventional two-way communication. In other words, the transmitter 504 may use on/off keying of the transmitted signal to adjust whether energy is available in the near-field. The receiver 608 may interpret these changes in energy as a message from the transmitter 504. From the receiver side, the receiver 608 may use tuning and de-tuning of the receive coil 618 to adjust how much power is being accepted from the field. In some embodiments, the tuning and de-tuning may be accomplished via the switching circuitry 612. The transmitter 504 may detect this difference in power used from the field and interpret these changes as a message from the receiver 608. Other forms of modulation of the transmit power and the load behavior may also be utilized.

With returned reference to FIG. 6, receive circuitry 610 may further include signaling detector and beacon circuitry 614 configured to identify received energy fluctuations, that may correspond to informational signaling from the transmitter to the receiver. Furthermore, signaling and beacon circuitry 614 may also be used to detect the transmission of a reduced signal energy (e.g., a beacon signal) and to rectify the reduced signal energy into a nominal power for awakening either un-powered or power-depleted circuits within receive circuitry 610 in order to configure receive circuitry 610 for wireless charging.

Receive circuitry 610 further includes processor 616 for coordinating the processes of receiver 608 described herein including the control of the RX impedance adjustment and switching circuitry 512 described herein. Cloaking of receiver 608 may also occur upon the occurrence of other events including detection of an external wired charging source (e.g., wall/USB power) providing charging power to charging device 650. Processor 616, in addition to controlling the cloaking of the receiver, may also monitor beacon circuitry 614 to determine a beacon state and extract messages sent from the transmitter 504. Processor 616 may also adjust the DC-to-DC converter 622 for improved efficiency and performance.

Figure 7:
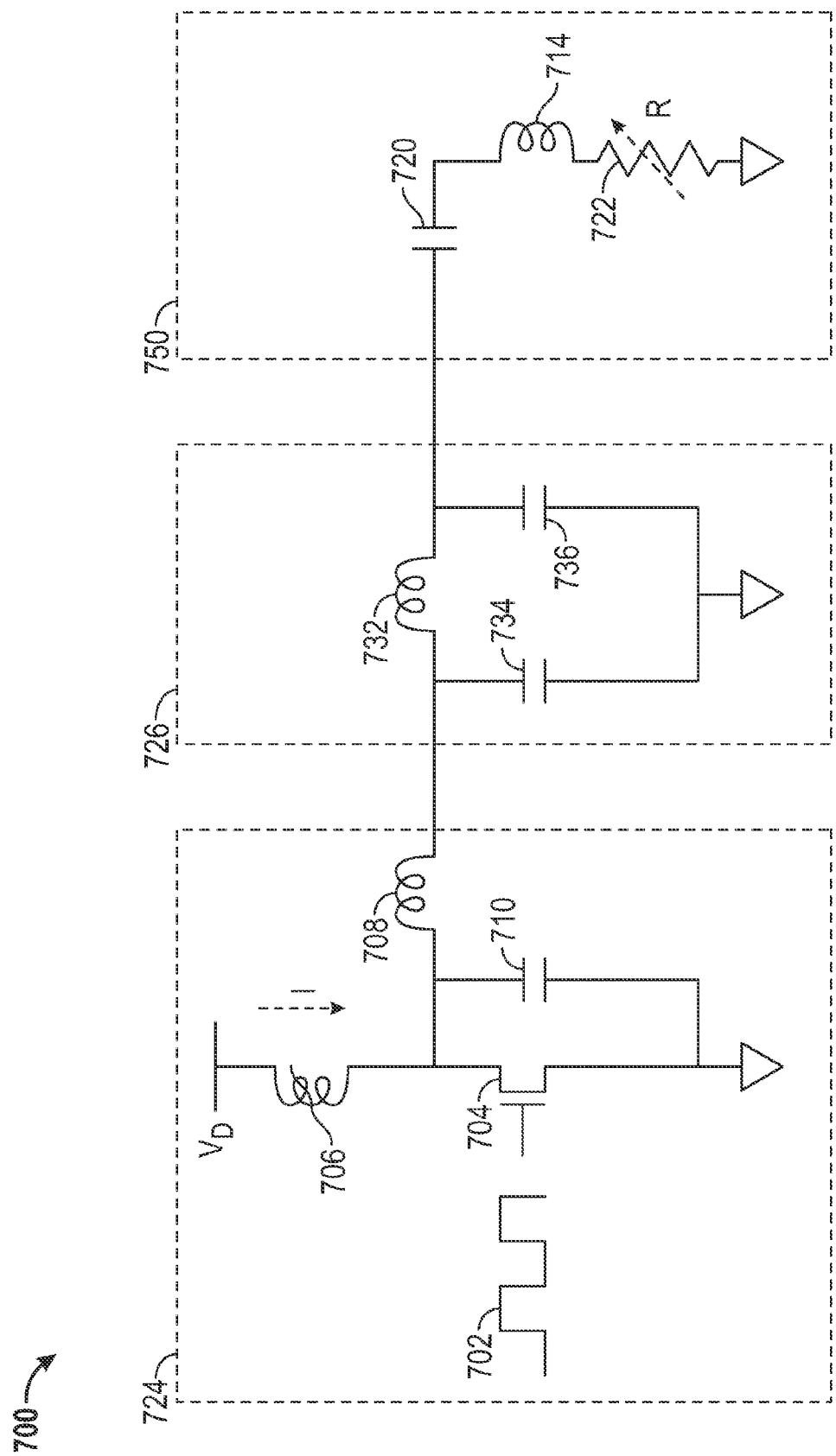
FIG. 7 is a schematic diagram of a portion of transmit circuitry that may be used in the transmit circuitry of FIG. 5.

FIG. 7 is a schematic diagram of a portion of transmit circuitry 700 that may be used in the transmit circuitry 505 of FIG. 5. The transmit circuitry 700 may include a driver circuit 724 as described above with reference to driver circuit 524 in FIG. 5. As described above, the driver circuit 724 may be a switching amplifier that may be configured to receive a square wave and output a sine wave to be provided to the transmit circuit 750. In some embodiments, the driver circuit 724 may be referred to as an amplifier circuit. The driver circuit 724 is shown as a class E amplifier; however, any suitable driver circuit 724 may be used in accordance with embodiments of the invention. The driver circuit 724 may be driven by an input signal 702 from an oscillator 523 as shown in FIG. 5. The driver circuit 724 may also be provided with a drive voltage $V_D$ that is configured to control the maximum power that may be delivered through a transmit circuit 750. To eliminate or reduce harmonics, the transmit circuitry 700 may include a filter circuit 726. The filter circuit 726 may be a three pole (capacitor 734, inductor 732, and capacitor 736) low pass filter circuit 726.

The signal output by the filter circuit 726 may be provided to a transmit circuit 750 comprising a coil 715. The transmit circuit 750 may include a series resonant circuit having a capacitance corresponding to capacitor 720 and inductance (e.g., that may be due to the inductance or capacitance of the coil or to an additional capacitor component) that may resonate at a frequency of the filtered signal provided by the driver circuit 724. The load of the transmit circuit 750 may be represented by the variable impedance 722 which may include a resistive component and a reactive component. The value of the impedance 722 as seen by the transmit circuit 750 may be a function of one or more wireless power receivers that are positioned to receive power from the transmit circuit 750. The transmit circuit 750 may be configured to stably operate within a predetermined range of loading conditions as will be described with reference to FIG. 9 below.

Figure 8:
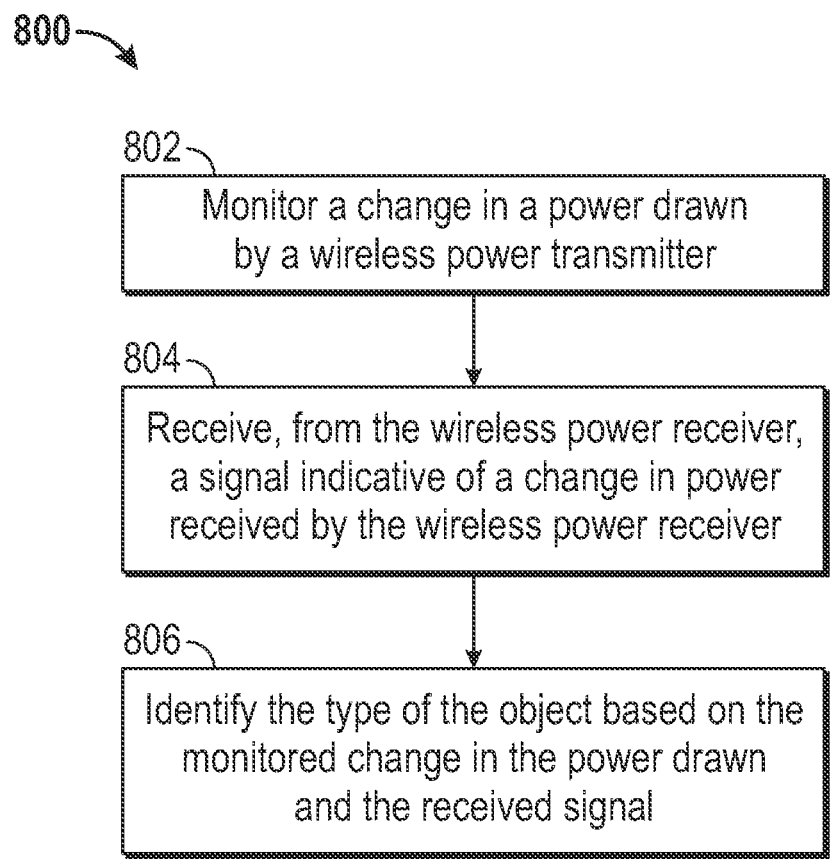
FIG. 8 is a flowchart of a method of identifying a type of object in a wireless power field according to some embodiments.

FIG. 8 is a flowchart of a method of identifying a type of object in a wireless power field according to some embodiments. The method 800 may be performed by a wireless power transmitter, such as transmitter 504 as discussed above with reference to FIG. 5 and which may be incorporated in a charger, such as charger 482 as discussed above with reference to FIG. 4. As shown in FIG. 8, the method 800 includes monitoring a change in a power drawn by wireless power transmitter is shown by block 802. For example, as discussed above with reference to FIG. 5, a load sensing circuit 516 may be configured to monitor the amount of current drawn by driver 524. The method 800 also includes receiving, from the wireless power receiver, a signal indicative of a change in power received by the wireless power receiver is shown by block 804. For example, a detection and/or communication unit 580 may be configured to receive a communication signal which includes information indicative of a change in power received by the wireless power receiver. In one embodiment, the communication signal may be transferred via in-band signaling through modulation of the wireless power transfer field which may be processed at least in part by the detection and/or communication unit 580. In one embodiment, the detection and/or communication unit 580 may include a communication element, such as an antenna, and may be configured to receive a signal communicated via a separate communication channel, such as via an RF communication signal. Further, the method 800 includes identifying the type of the object based on the monitored change in the power drawn and the received signal as shown by block 806. For example, based on the monitored change in the power drawn and the received signal, a controller (e.g., controller 515) of the wireless power transmitter may determine the type of object present within the wireless power field from among an authorized wireless power receiver, an unauthorized wireless power receiver, an unintended absorber (e.g., a metal object), and a communication device such as a NFC device or an RFID device.

The identification of the type of object and the wireless power field may be based on the configuration of a driver response of the wireless power transmitter. For example, in the case of a Class E amplifier as discussed above with reference to FIG. 7, the amount of current drawn by a driver 724 may be based on the loading conditions (e.g., impedance value of equivalent variable impedance 722) as seen by the wireless power transmitter. The impedance response of the wireless power transmitter will be described in greater detail with reference to FIGS. 9, 10, 11A, 11B, and 12 below. Each of FIGS. 9, 10, 11A, 11B, and 12 include smith charts which plot impedances on a 50:1 scale.

Figure 9:
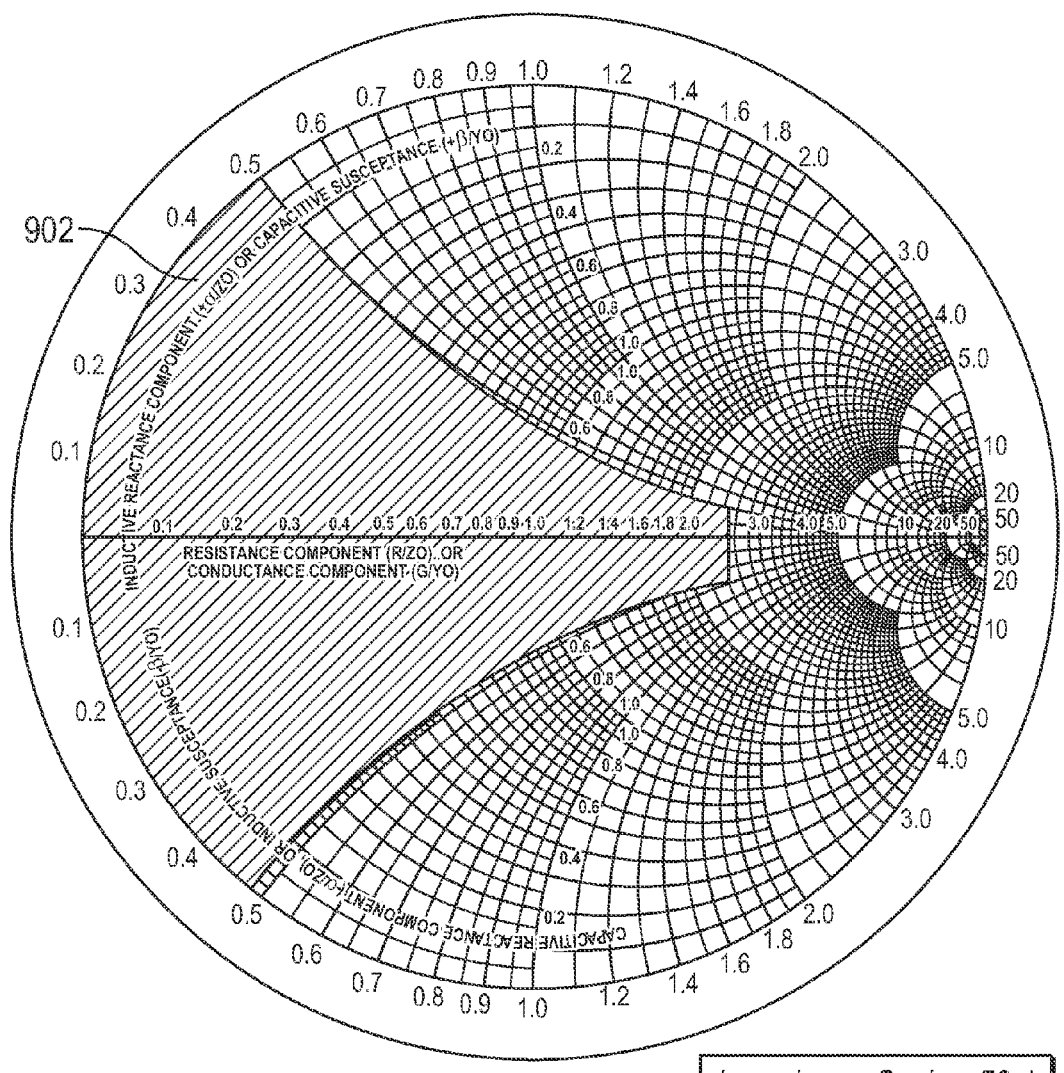
FIG. 9 is a plot showing one example of an operating range of impedance values as seen by a wireless power transmitter according to some embodiments.

FIG. 9 is a plot showing one example of an operating range of impedance values as seen by a wireless power transmitter according to some embodiments. FIG. 9 shows a Smith chart for plotting a complex impedances using circles representing constant resistive values and a reactive values. For example, as shown in FIG. 9, each intersection of two lines corresponds to a value of a resistive (e.g., real) component and a reactive (e.g., imaginary) component of a complex impedance characterized by a function R+jX, where R is the resistive component and X is the reactive component of the complex impedance. As shown in FIG. 9, a driver (e.g., driver 524, 724) may be designed to operate within a bounded R and X range as indicated by range 902. The operating range is not limited to the illustrated example range shown in FIG. 9, and may be varied to provide a different driver response to various loading conditions.

Figure 10:
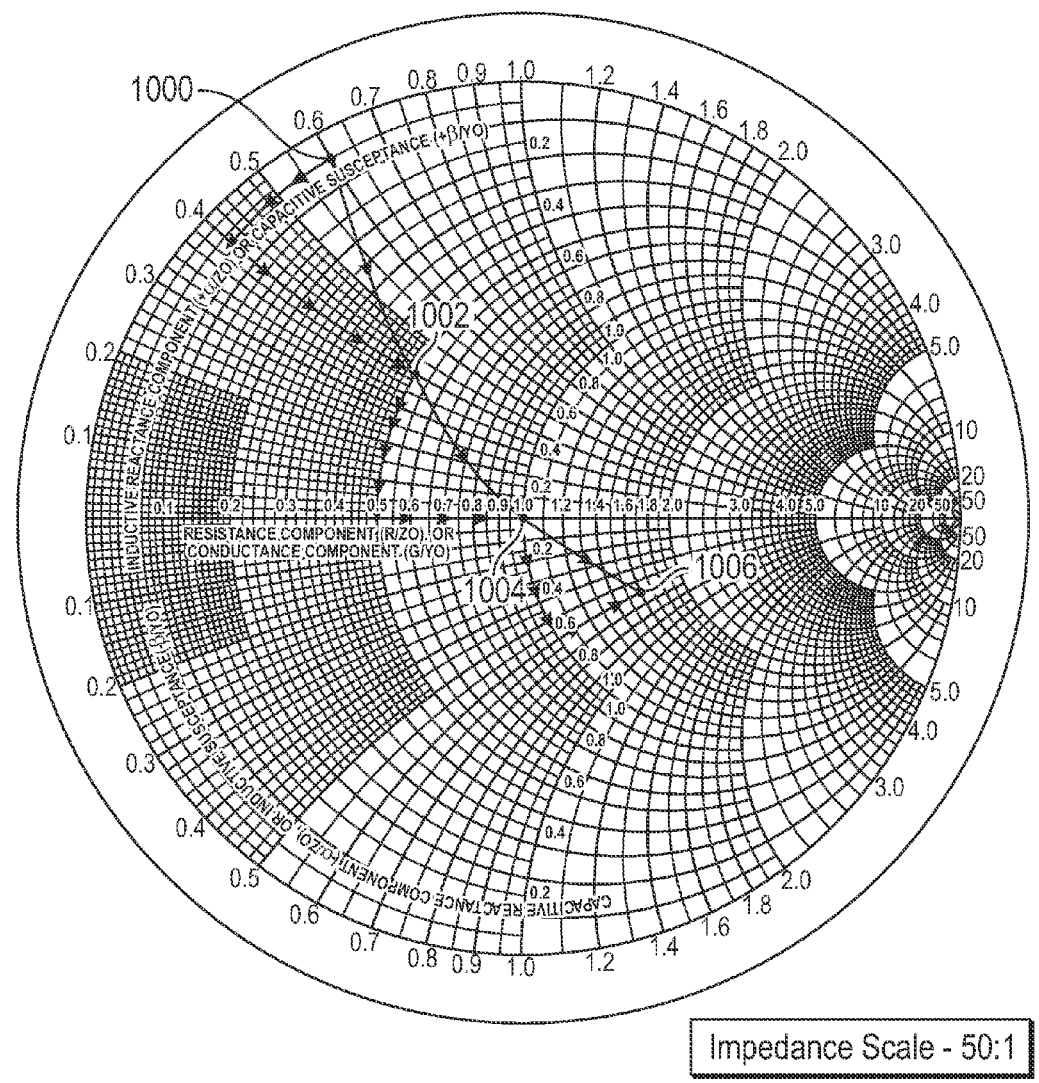
FIG. 10 is a plot showing a variation in impedance seen by the wireless power transmitter in the presence of one, two, and three wireless power receivers according to some embodiments.

FIG. 10 is a plot showing a variation in impedance seen by the wireless power transmitter in the presence of one, two, and three wireless power receivers according to some embodiments. In one example, a transmitter may be tuned to exhibit impedance having an inductive component and a small resistive component as shown when no load is presented to the transmitter. As shown in FIG. 10, in the absence of a load, the transmitter exhibits an impedance value of about 2.5+j 30 (or 50×(0.05+j 0.6)) as shown by impedance point 1000. Each of impedance points 1002, 1004, and 1006 illustrate the effect of addition of one, two, and three wireless power receivers respectively to the wireless power system. For example, the addition of one wireless power receiver may result in an impedance value of about 25+j 20 (or 50×(0.5+j 0.4)) as shown by impedance point 1002, which is both a resistive and reactive shift to the loading condition as seen by the transmitter relative to impedance point 1000. Similarly, the addition of a second receiver results in an impedance value of about 50+j 0 (or 50×(1+j 0)) as shown by impedance point 1004, while the addition of a third receiver results in an impedance value of about 80+j 30 (or 50×(1.6-j 0.6)) as shown by impedance point 1006. Therefore, as shown in FIG. 10, for a particular design, the addition of a wireless power receiver to the wireless power field results in both a real and a reactive shift to the impedance as seen by the transmitter.

Figure 11A:
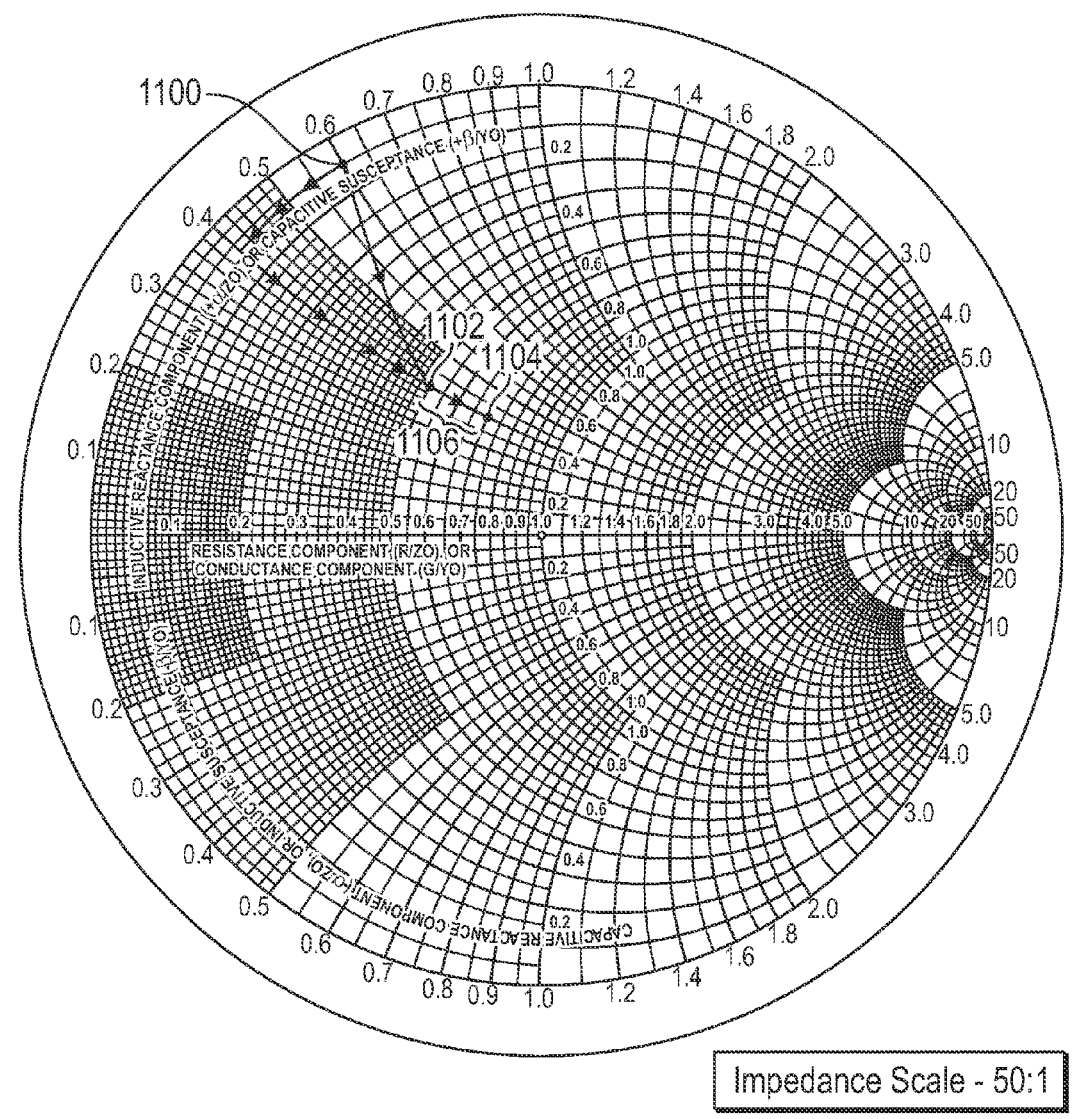
FIG. 11A is a plot showing a variation in impedance as seen by the wireless power transmitter in the presence of a wireless power receiver and a near-field communication or RFID device according to some embodiments.

FIG. 11A is a plot showing a variation in impedance as seen by the wireless power transmitter in the presence of a wireless power receiver and a near-field communication or RFID device according to some embodiments. In some embodiments, a transmitter may be tuned such that, in the absence of a load, the transmitter exhibits an impedance value of about 2.5+j 30 (or 50×(0.05+j 0.6)) as shown by impedance point 1100. The addition of different types of devices to the wireless power field may result in a different impedance shift. For example, the addition of one wireless power receiver results in an impedance value of about 25+j 20 (or 50×(0.5+j 0.4)) as shown by impedance point 1102, which is both a resistive and reactive shift to the loading condition as seen by the transmitter relative to impedance point 1100. The addition of a near-field (NFC) or RFID communication device may result in shift in only the real component of the impedance as shown by impedance point 1104 having a value of 35+j 20 (or 50×(0.7+j 0.4)). As shown, the resulting impedance only exhibits a resistive shift 1106.

Figure 11B:
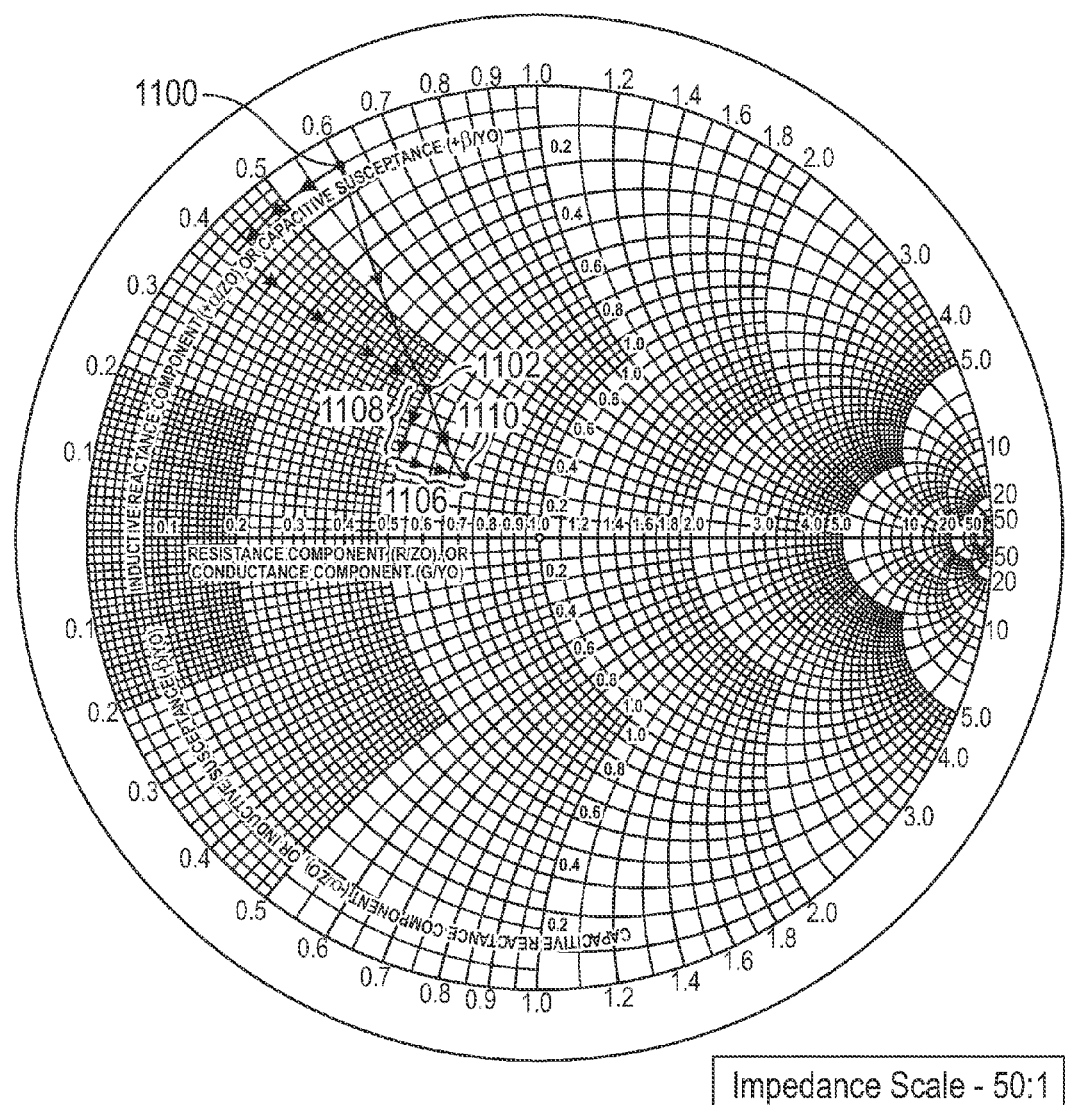
FIG. 11B is a plot showing a variation in impedance as seen by the wireless power transmitter in the presence of a wireless power receiver and another near-field communication or RFID device according to some embodiments.

Other NFC or RFID devices also exhibit both a real and a reactive shift to the impedance. FIG. 11B is a plot showing a variation in impedance as seen by the wireless power transmitter in the presence of a wireless power receiver and another near-field communication or RFID device according to some embodiments. As shown in FIG. 11B, the addition of a different NFC or RFID device results in both a resistive shift 1106 and a reactive shift 1108 impedance point 1110 having a value of 35+j 10 (or 50×(0.7+j 0.2)).

Figure 12:
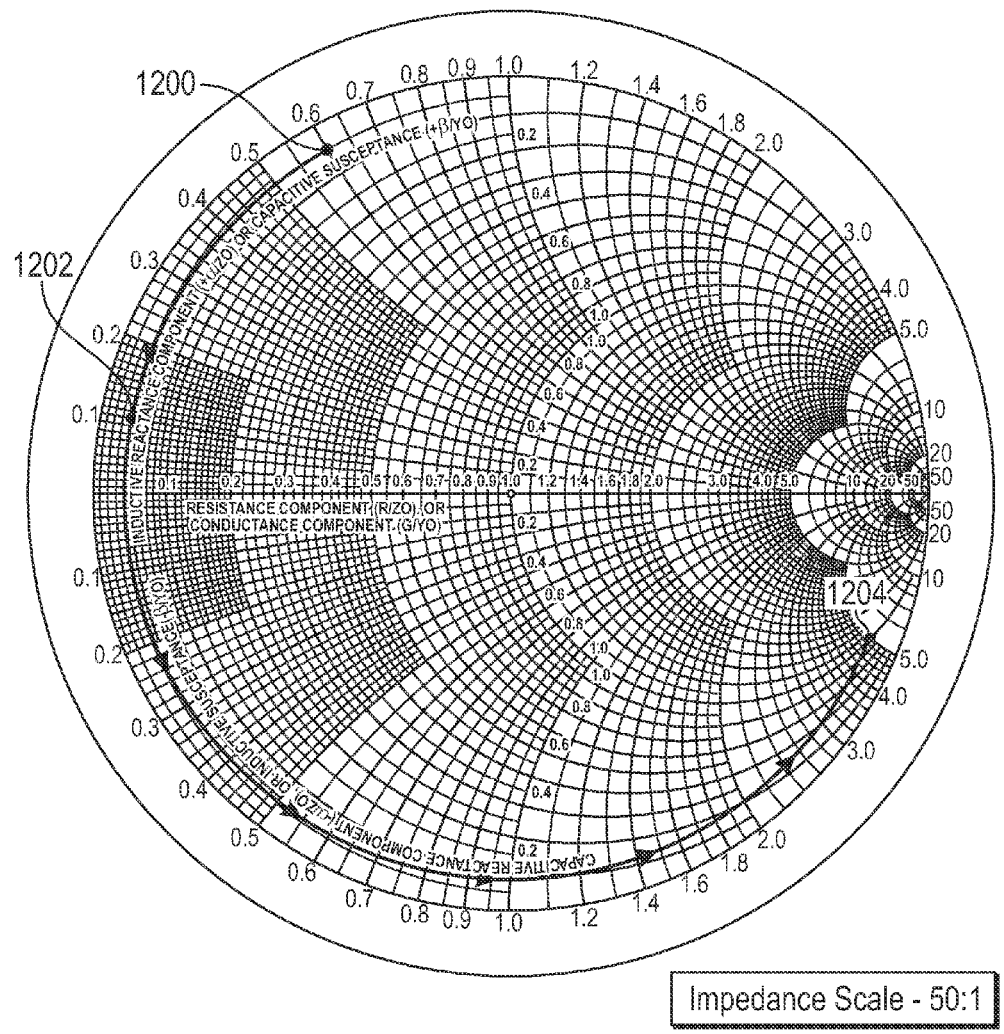
FIG. 12 is a plot showing a variation in impedance as seen by the wireless power transmitter in the presence of a metal object according to some embodiments.

FIG. 12 is a plot showing a variation in impedance as seen by the wireless power transmitter in the presence of a metal object according to some embodiments. In some embodiments, a transmitter may be tuned such that, in the absence of a load, the transmitter exhibits an impedance value of about 2.5+j 30 (or 50×(0.05+j 0.6)) as shown by impedance point 1200. The addition of a metal object to the wireless power field results in only a reactive shift to the impedance as seen by the transmitter. For example, the addition of a small metal object may result in a reactive shift to an impedance point 1202 having a value of 2.5+j 5 (or 50×(0.05+j 0.1)). The addition of a large metal object may result in a greater reactive shift to an impedance point 1204 having a value of 2.5+j 250 (or 50×(0.05-j 5.0)).

As discussed with reference to FIG. 7 above, a driver of a wireless power transmitter may be designed to exhibit a particular impedance response. Further, a voltage at an input of the voltage regulator of a wireless power receiver may change based on a voltage level output of the transmitter. For example, a driver may be configured to maintain the output power of the transmitter to meet the requirements of the load presented to the transmitter. As a result, the driver may draw more or less current in response to varying loading conditions. Further, a voltage at an input of a wireless power receiver's voltage regulator changes based on the output voltage of the transmitter. As a result, an input voltage level of the voltage regulator may vary based on varying loading conditions. For example, as discussed above with reference to FIG. 12, a metal object presented to the system results in a change in the tuning of the system through introduction of a reactance associated with the metal object. The reactance shift may result in an increase or decrease in system efficiency. In the case of reduced efficiency, a driver may be designed to draw greater current for driving the transmit coil when the metal object is present in the wireless power field. The reduced efficiency may also be measured as a lower voltage at the input of a receiver in the wireless power system. Alternatively, in the event that the metal object results in increased efficiency due to the reactance shift, an increase in voltage at the input of the receiver may be detected.

A near-field communication device, a RFID device, or a wireless power receiver (such as mobile phone) that is introduced to the wireless power field may result in an increase in resistance as seen by the transmitter as discussed above with reference to FIGS. 10-11. A driver may be designed to draw greater current and increase the current through the transmit coil in response to the increase in resistance. The voltage at the input of the receiver may be substantially maintained due to the increase in power output from the transmitter. A wireless power receiver that is removed from the system, or moved farther from a wireless power transmitter may result in less resistance as seen by the transmitter. A driver may be designed draw less current and reduce the current through the transmit coil in response to the reduced resistance, and the voltage at the input of the receiver may also be reduced due to the weaker coupling between the wireless power receiver and the transmitter. By monitoring the response of the transmitter and the receivers to varying loading conditions in view of the design parameters of the system, an object that is introduced to wireless power transfer field may be identified.

Figure 13:
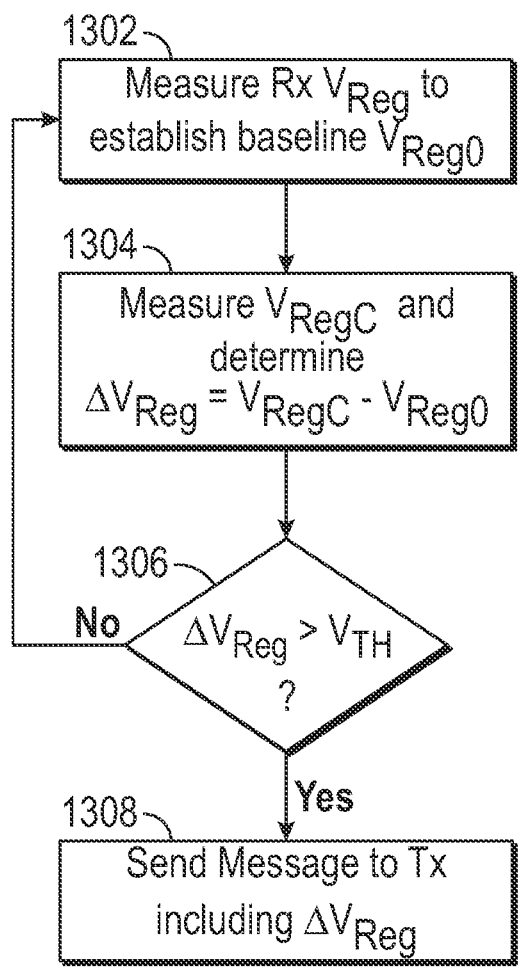
FIG. 13 is a flowchart of a method of determining a variation in received voltage according to some embodiments.

FIG. 13 is a flowchart of a method of determining a variation in received voltage according to some embodiments. The method 1300 illustrated in FIG. 13 is an example of a process operated in a wireless power receiver, such as a wireless power receiver 608 as discussed above with reference to FIG. 6, which may be included a chargeable device 484A or 484B as discussed above with reference to FIG. 4. The method 1300 may be implemented by a controller or processor, such as processor 616 to detect the presence of an unintentional absorber, and/or protection of devices in the wireless power system (e.g. a NFC card as discussed above).

The method 1300 may include the measurement of the voltage at the input of the regulator at the receiver as illustrated in block 1302 to establish a baseline voltage reading $V_{Reg0}$. The method may also include measuring a present value of regulator voltage $V_{RegC}$ to calculate a change in regulator voltage as $\Delta V_{Reg} = V_{RegC} - V_{Reg0}$ as shown by block 1304. At decision block 1306, the magnitude of the change in voltage $\Delta V_{Reg}$ is compared to a change in voltage threshold V-TH magnitude value. If the magnitude of the change in voltage $\Delta V_{Reg}$ is greater than the threshold magnitude change in voltage V-TH, a message may be sent to the transmitter as illustrated in block 1308. If is the measured voltage Vreg is not greater than the threshold voltage Vreg, the method may continue to measure the receiver regulator voltage at block 1302.

Figure 14:
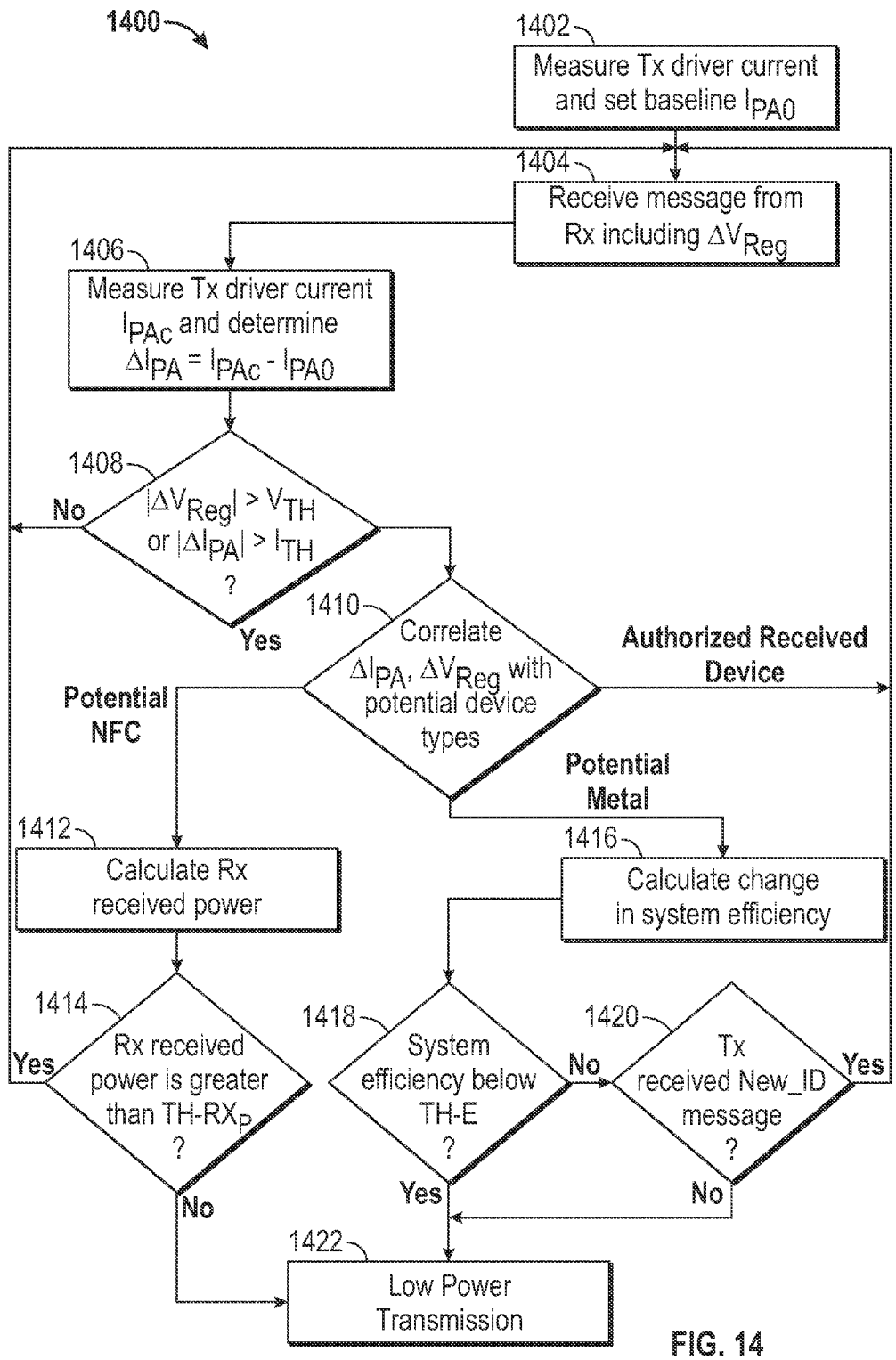
FIG. 14 is a flowchart of a method of identifying a type of object in a wireless power field based on a change in driver current and received voltage according to some embodiments.

FIG. 14 is a flowchart of a method of identifying a type of object in a wireless power field based on a change in driver current and received voltage according to some embodiments. For example, the method 1400 may be implemented in a wireless power transmitting device, such as charger 482 and/or transmitter 504. The method 1400 may be implemented by a controller or processor, such as controller 515, to detect the presence of an unintentional absorber, and/or protect devices in the wireless power system (e.g., a NFC card as discussed above). The method 1400 may allow communication between a transmitter and a receiver for reducing false detection of an undesired object (e.g. an absorber 486) in the system, and for protection of devices in the wireless power system.

The method may include measuring a level of current drawn by a driver of a wireless power transmitter to determine a baseline current level $I_{PA0}$ as shown by block 1402. At block 1404, a message may be received from a receiver indicating a change in voltage level $\Delta V_{Reg}$ at the input of a receiver's regulator. For example, the message may be communicated by a receiver to a transmitter as discussed above with reference to FIG. 13. The measurement of the input current to the driver of the transmitter may occur in parallel to or simultaneously with reception of a message from the receiver. At shown in block 1406, the method includes measuring a current drawn by the driver of the transmitter as a current level $I_{PAc}$ and determining a change in current drawn as $\Delta I_{PA} = I_{PAc} - I_{PA0}$. For example, as the loading conditions change, a driver of the transmitter may be configured to draw more or less current to meet the requirements of the load presented to the transmitter.

At decision block 1408, the method determines whether a magnitude of the change in measured voltage $\Delta V_{Reg}$ at the receiver has exceeded a threshold voltage change $V_{TH}$. In some embodiments, the comparison of the magnitude of the change in measured voltage $\Delta V_{Reg}$ and the threshold voltage change $V_{TH}$ may be performed at the receiver, and the message received from the receiver may indicate whether the magnitude of the change in measured voltage message $\Delta V_{Reg}$ is greater than the threshold voltage change $V_{TH}$. Further, at decision block 1408, the method may determine whether a magnitude of a change in current $\Delta I_{PA}$ is greater than a threshold current change level $I_{TH}$. If the magnitude of the measured voltage change $\Delta V_{Reg}$ has exceeded the threshold voltage change $V_{TH}$, or the magnitude of the measured current change $\Delta I_{PA}$ has exceeded the threshold voltage change $I_{TH}$, the method may proceed to decision block 1410. If the measured voltage change $\Delta V_{Reg}$ has not exceeded the threshold voltage change $V_{TH}$, and the measure current change $\Delta I_{PA}$ has not exceeded the threshold current change $I_{TH}$, the method may return to block 1404, where a message from a receiver regarding the voltage change $\Delta V_{Reg}$ is monitored and the current change the input of the driver of the transmitter is re-determined at block 1406.

In some embodiments, a method of controlling the wireless power transmission system based on the measured voltage change $\Delta V_{Reg}$ and current change $\Delta I_{PA}$ may compare a change in voltage $\Delta V_{Reg}$ and a change in current $\Delta I_{PA}$ with a predetermined threshold magnitude (e.g., TH-I and V-TH). Based on the comparison of the magnitude of change in current, magnitude of changing in voltage, and the direction of change in each (e.g., positive or negative change), the method may discriminate the type of device that is present within the wireless power transmission region. In some implementations, a transmitter may rely on a look-up table to correlate the change values and determine if an unauthorized device is present within a wireless power transmission region. For example, the transmitter may lookup the values of the change in voltage at the input of the regulator $\Delta V_{Reg}$ of the receiver and change in current at the input of the driver $\Delta I_{PA}$. The look-up table may be stored in memory, such as memory 572, and be accessible by a controller 515 of the transmitter 504 as discussed above with reference to FIG. 5.

With returned reference to FIG. 14, as shown in decision block 1410 the method may correlate the values of the change in voltage at the input of the regulator $\Delta V_{Reg}$ of the receiver and current at the input of the power amplifier at the transmitter $I_{PA}$ with values stored in the look-up table. Based on the design of a driver, the look-up table may correlate the known impedance response of the driver to assist in identification of the type of device that is present within the charging field. One example of a look-up table is shown in Table 1 below, which is based on one particular design of a driver having a known impedance response.

TABLE 1

|  | $-\Delta V_{Reg}$ | $|\Delta V_{Reg}| < V_{TH}$ | $+\Delta V_{Reg}$ |
|---|---|---|---|
| $-\Delta I_{PA}$ | Continue Charging | Potential Metal | Potential Metal |
| $|\Delta I_{PA}| < I_{TH}$ | Potential NFC | Continue Charging | Potential Metal |
| $+\Delta I_{PA}$ | Potential NFC | Potential NFC | Potential Metal |

As shown in Table 1, if the change in voltage $\Delta V_{Reg}$ has a positive value and a magnitude that is greater than the threshold (e.g., $+\Delta V_{Reg}$ as shown in Table 1), the method may determine that a potential metal is present in the system and may proceed to block 1416 as shown in FIG. 4. If the magnitude of the change in voltage $\Delta V_{Reg}$ is less than the threshold change in voltage $V_{TH}$, the determination of the type of device may be based on the change in current $\Delta I_{PA}$ drawn by the driver. For example, as shown in Table 1 and as discussed above with reference to decision block 1408, if both the magnitude of the change in voltage $\Delta V_{Reg}$ and the magnitude of the change in current $\Delta I_{PA}$ are less than the threshold values, the method may determine that an authorized receiver is within the charging field and may continue to perform a wireless power charging operation. If the magnitude of the change in voltage $\Delta V_{Reg}$ is less than the threshold voltage change $V_{TH}$, and the change in current $\Delta I_{PA}$ has a positive value and a magnitude that is greater than the threshold current change $I_{TH}$ (e.g., $+\Delta I_{PA}$ as shown in Table 1), the method may determine that there is potentially a NFC or RFID device within the charging field and may proceed to block 1412 as shown in FIG. 4. If the magnitude of the change in voltage $\Delta V_{Reg}$ is less than the threshold voltage change $V_{TH}$, and the change in current $\Delta I_{PA}$ has a negative value and has a magnitude that is greater than the threshold current change $I_{TH}$, the method may determine that there is potentially a metal object within the charging field and may proceed to block 1416 as shown in FIG. 4.

If the change in voltage $\Delta V_{Reg}$ has a negative value and a magnitude that is greater than the threshold (e.g., $-\Delta V_{Reg}$ as shown in Table 1), the method may determine that a NFC device (or RFID device) may potentially be within the charging region if the change in current has a magnitude that is less than the threshold change in current $I_{TH}$, or has a positive value and a magnitude that is greater than the threshold change in current $I_{TH}$ (e.g., $+\Delta I_{PA}$). If the change in voltage $\Delta V_{Reg}$ has a negative value and a magnitude that is greater than the threshold $V_{TH}$ (e.g., $-\Delta V_{Reg}$ as shown in Table 1), and the change in current has a negative value and a magnitude that is greater than the threshold current change $I_{TH}$ (e.g., $-\Delta I_{PA}$), the method may determine that an authorized receiver device is in the charging region and may proceed by continuing a charging operation and return to block 1404 to continue monitoring values of $\Delta V_{Reg}$.

Following the determination of a potential NFC device (or RFID device) within the charging region, the method may calculate the amount of power received by a receiver as shown in block 1412. The amount of power received by the receiver may be determined and/or calculated based on the message received from the receiver. The method may then proceed to decision block 1414, and the amount of power received by the receiver is compared to the threshold receive power TH-RX$_P$. If the amount of power received is greater than the threshold value, the method may determine that a NFC device or RFID device is not in the charging region, may proceed with the charging operation and return to block 1404. If the amount of power received is less than the threshold value, the method may determine that a NFC device or RFID device is within the charging region, and may enter a low power transmission mode as shown at block 1422 in order to protect the NFC device or RFID device. The low power transmission mode may correspond to a level of power output from the transmitter such that an NFC device or an RFID device would not be damaged by the wireless power transfer field. For example, the low power transmission mode may correspond to power output from the transmitter such that the amount of power received by an RFID device or NFC device is less than a predetermined threshold value. The amount of power received by the RFID device or NFC device is a function of the power output from the transmitter, the coupling efficiency between the transmitter and the RFID device or NFC device, the presence of wireless power receivers in the system, and the coupling efficiency between the transmitter and each of the wireless power receivers which may be present. For example, in the absence of a wireless power receiver, the output power of the transmitter may be set to provide less than about 400 mW to the RFID device or NFC device. In the presence of one or more wireless power receivers, the output power from the transmitter may be set to a level that provides power to the one or more wireless power receivers in the system, and less than about 400 mW to the RFID device or NFC device.

Following determination of a potential metal object within the charging region, the method may calculate a change in system efficiency as shown in block 1416. For example, the amount of power received by all wireless power receivers within the charging region may be compared with the amount of power output by the wireless power transmitter. The amount of power received by the wireless power receivers may be determined by one or more messages sent from the wireless power receivers. At decision block 1418, the system efficiency is compared with a threshold efficiency value TH-E. If the system efficiency is below the threshold efficiency value, the method may determine that a significant metal object is within the charging region and may enter the low power transmission mode shown in block 1422 in order to protect the wireless power transmitter and the receivers. If the system efficiency is greater than the threshold value, the method may proceed to decision block 1420. At decision block 1420, the method may determine whether the transmitter has received a new identification message from a wireless power receiver. If the transmitter has received a new identification message, the method may continue with the charging operation may return to block 1404. For example, a new receiver which is introduced to the system may enter the system with its charge port disabled. As a result, the receiver may be perceived by the transmitter as a metal object. The transmitter may first confirm that a NFC device has not been added as discussed with reference to decision block 1410. Following this determination, the transmitter may increase the voltage output in anticipation of a receiver device turning on its charge port. The receiver may then detect an increase in the voltage output of the transmitter by measuring an increase in the voltage level at the input of the regulator of the receiver (e.g., $\Delta V_{Reg}$). In response to the detection of the increase in the regulator voltage, the receiver may then turn on its charge port. If the transmitter has not received the new ID message, the method may determine that a metal has been detected in the system, and proceed to enter a low power transmission mode as shown in block 1422. The low power transmission mode may correspond a power output level from the transmitter such that the metal object's effect on the transmitter would not damage the transmitter.

By confirming the level of received power at decision block 1418 and system efficiency at decision block 1418, the method may exclude the false detection of a NFC device, RFID device, or metal object.

As shown in FIG. 14, the method proceeds by discontinuing transmission when a NFC device, RFID device, or metal object are detected. However, the performance of the transmitter following identification of an object in the wireless field may be based on whether the transmitter has detected a NFC device, an RFID device, or metal in the system. If the transmitter has detected a NFC or RFID device, the transmitter may adjust its operation, for example, by discontinuing transmission, in order to protect the NFC or RFID device from being damaged by the wireless field. If the transmitter has detected a metal, the transmitter may adjust its operation, for example, by reducing a power output, in order to protect the transmitter and other receiver devices from the effects of the detected metal on the wireless field.

During a low power transmission mode, in some embodiments, the transmitter may be configured to set a baseline current level $I_{LP}$ for the current drawn by the driver. The current drawn by the driver may be monitored relative to the baseline current $I_{LP}$. If a change in current is detected which exceeds a threshold change in current value (e.g., $I_{TH-ER}$), it is determined that the object that was identified has been removed from the system and the transmitter may proceed with normal power transmission.

Figure 15:
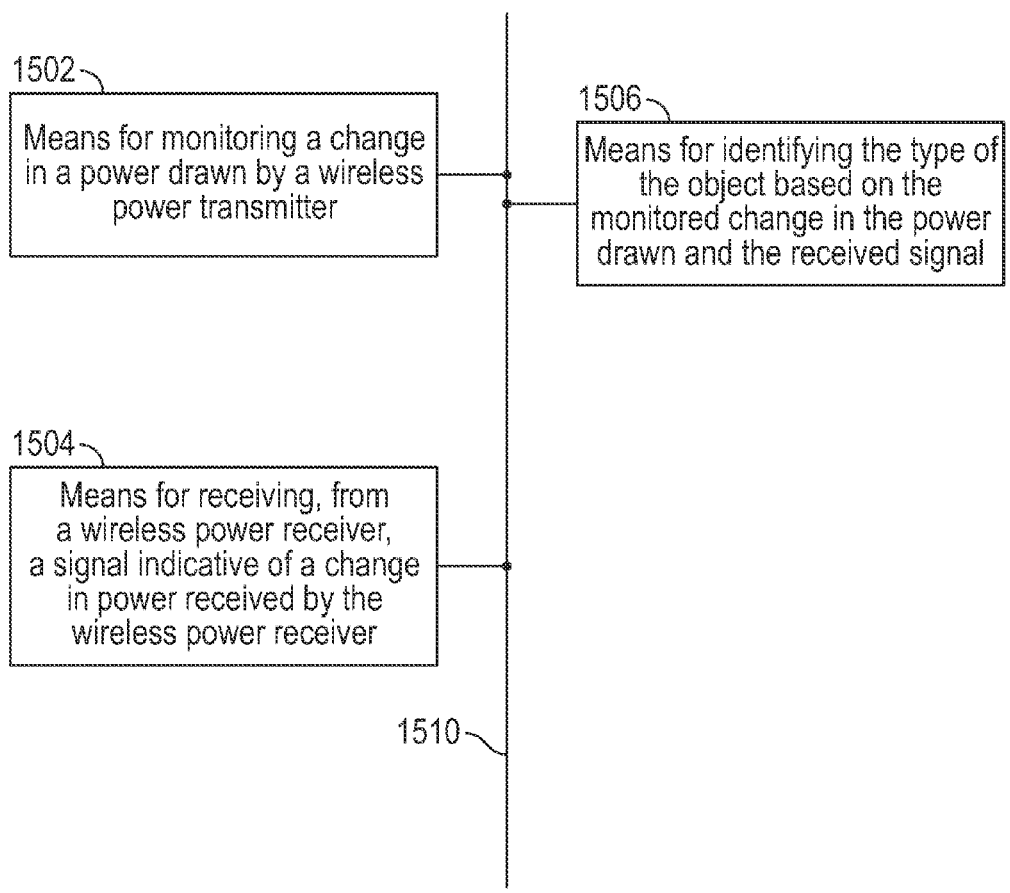
FIG. 15 is a functional block diagram of an apparatus for identifying a type of object in a wireless power field according to some embodiments.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. FIG. 15 is a functional block diagram of an apparatus for identifying a type of object in a wireless power field according to some embodiments. For example, as shown in FIG. 15, the apparatus may include means for monitoring a change in power drawn by wireless power transmitter as illustrated by block 1502. For example, the means for monitoring a change in power drawn may correspond to a current sensor coupled to the input of the driver circuit of the transmitter as discussed above with reference to load sensing circuit 516 of FIG. 5. The apparatus also includes means for receiving, from a wireless power receiver, a signal indicative of a change in power received by the wireless power receiver as illustrated by block 1504. For example, the means of receiving the signal may correspond to a detection and/or communication unit 508 as discussed above with reference to FIG. 5. The apparatus also includes means for identifying a type of the object based on the monitored change in power drawn and the received signal as illustrated by block 1506. For example, the means for identifying the type of the object may correspond to a controller 515 as discussed above with reference to FIG. 5. Each of the components of the apparatus may be configured to communicate via a communication and/or control bus 1510.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for detecting an object within a power delivery region of a wireless power transmitter configured to transfer power to a device having a wireless power receiver, the apparatus comprising:
   a driver configured to generate a driving signal to drive a circuit to output a wireless power field;
   a sensor configured to sense an amount of power drawn by the driver to generate a sensing signal;
   a communication unit configured to receive, from the wireless power receiver, a signal indicative of a change in power received by the wireless power receiver, the signal including information regarding a direction of change in current, a direction of change in voltage, and a magnitude of the change in power received by the wireless power receiver; and
   a controller configured to monitor a change in a power drawn by the driver based on the sensing signal and identify the type of object based at least in part on a comparison of the direction of change in current, the direction of change in voltage, and the magnitude of the change in power received by the wireless power receiver and the monitored change in power drawn, the controller further configured to compare the change in power drawn to a first threshold and the received signal to a second threshold.

2. The apparatus of claim 1, wherein the sensor is configured to sense an initial level of power drawn by the driver, and the controller is configured to determine a baseline value of power drawn by the driver based on the sensed initial level.

3. The apparatus of claim 2, wherein the controller is configured to determine the change in power drawn based on a comparison of the sensing signal and baseline value.

4. The apparatus of claim 1, further comprising adjusting the output power of the wireless power field when at least one of the first and second thresholds is exceeded.

5. The apparatus of claim 1, wherein the signal indicative of a change in power received by the wireless power receiver is determined based on comparison of a measured amount of power received by the wireless power receiver relative to a baseline amount of power received by the wireless power receiver, and wherein the baseline amount of power received is predetermined by the wireless power receiver.

6. The apparatus of claim 1, wherein the controller is configured to determine a direction of change in current, a direction of change in voltage, and a magnitude of the change in power drawn by the driver, and wherein the controller is configured. to identify the type of object based at least in part on the direction of change in current, the direction of change in voltage, and the magnitude of the change in power drawn by the driver.

7. The apparatus of claim 1, wherein the object is one of a near-field communication (NFC) device, a radio frequency identification (RFID) device, an unauthorized wireless power receiver, an authorized wireless power receiver, and a metal object.

8. The apparatus of claim. 1, wherein the controller is configured to monitor a change in current drawn by the driver.

9. The apparatus of claim 1, wherein the information regarding the direction of change in voltage comprises a magnitude and direction of a change in voltage received at an input of a voltage regulator of the wireless power receiver.

10. A method of identifying a type of an object within a power transfer region of a wireless power transmitter configured to transfer power to a device including a wireless power receiver, the method comprising:
    monitoring a change in a power drawn by the wireless power transmitter;
    receiving, from the wireless power receiver, a signal indicative of a change in power received by the wireless power receiver, the signal including information regarding a direction of change in current, a direction of change in voltage, and a magnitude of the change in power received by the wireless power receiver; and
    identifying the type of the object based at least in part on a comparison of the direction of change in current, the direction of change in voltage, and the magnitude of the change in power received by the wireless power receiver and the monitored change in power drawn, wherein the identifying the object comprises comparing the change in power drawn to a first threshold and the received signal to a second threshold.

11. The method of claim 10, further comprising receiving a signal indicative of an amount of power received by one or more wireless power receivers.

12. The method of claim 11, further comprising determining an efficiency level of power transferred to the one or more receivers; comparing the determined efficiency level with a threshold efficiency level; and determining if a new receiver identification message has been received if the efficiency level is greater than the threshold efficiency level.

13. The method of claim 12, further comprising determining that a metal object is present if a new receiver identification message has not been received.

14. The method of claim 11, further comprising comparing the amount of power received by a wireless power receiver with a threshold receive power level, and determining that a near-field communication device is present if the received power is less than the threshold level.

15. The method of claim 11, further comprising determining an efficiency level of power transferred to the one or more receivers; comparing the determined efficiency level with a threshold efficiency level; and determining that a metal object is present if the efficiency level is less than the threshold efficiency level.

16. The method of claim 10, wherein the signal indicative of a change in power received by the wireless power receiver is determined based on comparison of a measured amount of power received by the wireless power receiver relative to a baseline amount of power received by the wireless power receiver, wherein the baseline amount of power received is predetermined by the wireless power receiver.

17. The method of claim 16, further comprising receiving a signal indicative of the baseline amount of power received by the receiver, and wherein the second threshold value is determined based on the baseline value.

18. The method of claim 10, further comprising adjusting the output power of a wireless power field when at least one of the first and second thresholds is exceeded.

19. The method of claim 10, further comprising sensing an initial level of power drawn by the driver, and determining the first threshold value based on the initial level of power drawn by the driver.

20. The method of claim 10, wherein the object is one of a near-field communication (NFC) device, a radio frequency identification (RFID) device, an unauthorized wireless power receiver, an authorized wireless power receiver, and a metal object.

21. The method of claim 10, wherein monitoring the change in power comprises monitoring a change in current drawn by a driver of the wireless power transmitter.

22. The method of claim 10, wherein the information regarding the direction of change in voltage comprises a magnitude and direction of a change in voltage at an input of a regulator.

23. An apparatus for identifying a type of an object within a power transfer region of a wireless power transmitter configured to transfer power to a device including a wireless power receiver, the apparatus comprising:

means for monitoring a change in a power drawn by the wireless power transmitter;

means for receiving, from the wireless power receiver, a signal indicative of a change in power received by the wireless power receiver, the signal including information regarding a direction of change in current, a direction of change in voltage, and a magnitude of the change in power received by the wireless power receiver;

means for comparing the change in power drawn to a first threshold and the received signal to a second threshold; and means for identifying the type of the object based at least in part on a comparison of the direction of change in current, the direction of change in voltage, and the magnitude of the change in power received by the wireless power receiver and the monitored change in power drawn.

24. The apparatus of claim 23, wherein the means for monitoring comprises a current sensor coupled to a driver of the wireless power transmitter, the means for receiving comprises a communication or detection unit, and the means for identifying comprises a controller.

* * * * *